United States Patent [19]

Benker et al.

[11] Patent Number: 4,947,205
[45] Date of Patent: Aug. 7, 1990

[54] METHOD OF AND APPARATUS FOR POSITIONING PHOTOGRAPHIC ORIGINALS IN A COPYING STATION

[75] Inventors: Gerhard Benker, Pullach; Wilhelm Nitsch; Bernd Payrhammer, both of Munich; Volker Weinert, Taufkirchen; Helmut Treiber; Ulrich Klueter, both of Munich, all of Fed. Rep. of Germany

[73] Assignee: AGFA-Gevaert Aktiengesellschaft, Leverkusen, Fed. Rep. of Germany

[21] Appl. No.: 415,065

[22] Filed: Sep. 29, 1989

[30] Foreign Application Priority Data

Oct. 4, 1988 [DE] Fed. Rep. of Germany ....... 3833732

[51] Int. Cl.⁵ ............... G03B 27/52; G03B 27/32; G01N 21/86; G01V 9/04
[52] U.S. Cl. .................... 355/41; 250/559; 355/38; 355/77
[58] Field of Search ............. 250/559–561, 250/571, 548; 356/443, 444; 355/41, 50, 38, 77, 68; 353/26 A; 382/65

[56] References Cited

U.S. PATENT DOCUMENTS

| | | | |
|---|---|---|---|
| 3,516,741 | 6/1970 | Thaddey | 355/41 X |
| 3,768,903 | 10/1973 | Steinberger et al. | 355/41 X |
| 4,167,678 | 9/1979 | Mischo | 250/559 |
| 4,176,944 | 12/1979 | Payrhammer | 355/41 X |
| 4,251,157 | 2/1981 | Knör et al. | 250/559 X |
| 4,279,502 | 7/1981 | Thurm et al. | 355/38 |
| 4,611,907 | 9/1986 | Inatsuki | 355/41 |
| 4,750,021 | 6/1988 | Holroyd et al. | 355/41 |
| 4,864,149 | 9/1989 | Matsumoto | 250/461 |
| 4,893,345 | 1/1990 | Matsumoto | 355/41 X |

Primary Examiner—Richard A. Wintercorn
Attorney, Agent, or Firm—Peter K. Kontler

[57] ABSTRACT

A filmstrip containing a series of images is conveyed along a path which passes by a copying station and a scanning station. The filmstrip is advanced in steps using transporting rolls and a narrow segment of the filmstrip is scanned at the scanning station after every step. A first set of measurements obtained upon scanning of the filmstrip is used to calculate the amounts of light and the exposure times required to properly reproduce the images. A second set of measurements is used to detect characteristic regions of the filmstrip having abrupt changes in density. The positions of the characteristic regions along the filmstrip are established by a counter which counts the steps undergone by the filmstrip and the measurement or measurements corresponding to each characteristic region are stored together with the respective position. The positions of the characteristic regions and the second set of measurements are used to calculate the positions of the images along the filmstrip. After the filmstrip has been completely scanned, the filmstrip is conveyed along the path once more. During the second trip along the path, the filmstrip is scanned again while the distance traveled by the filmstrip is measured by the counter. Upon detection of a characteristic region, the position of such region along the filmstrip as measured by the counter during the second trip is compared with the stored position obtained during the first trip. If the positions are different, the counter is changed to match the stored position. This compensates for slip between the filmstrip and the transporting rolls thereby allowing the images to be accurately positioned in the copying station for reproduction as the filmstrip travels along the path for the second time.

32 Claims, 5 Drawing Sheets

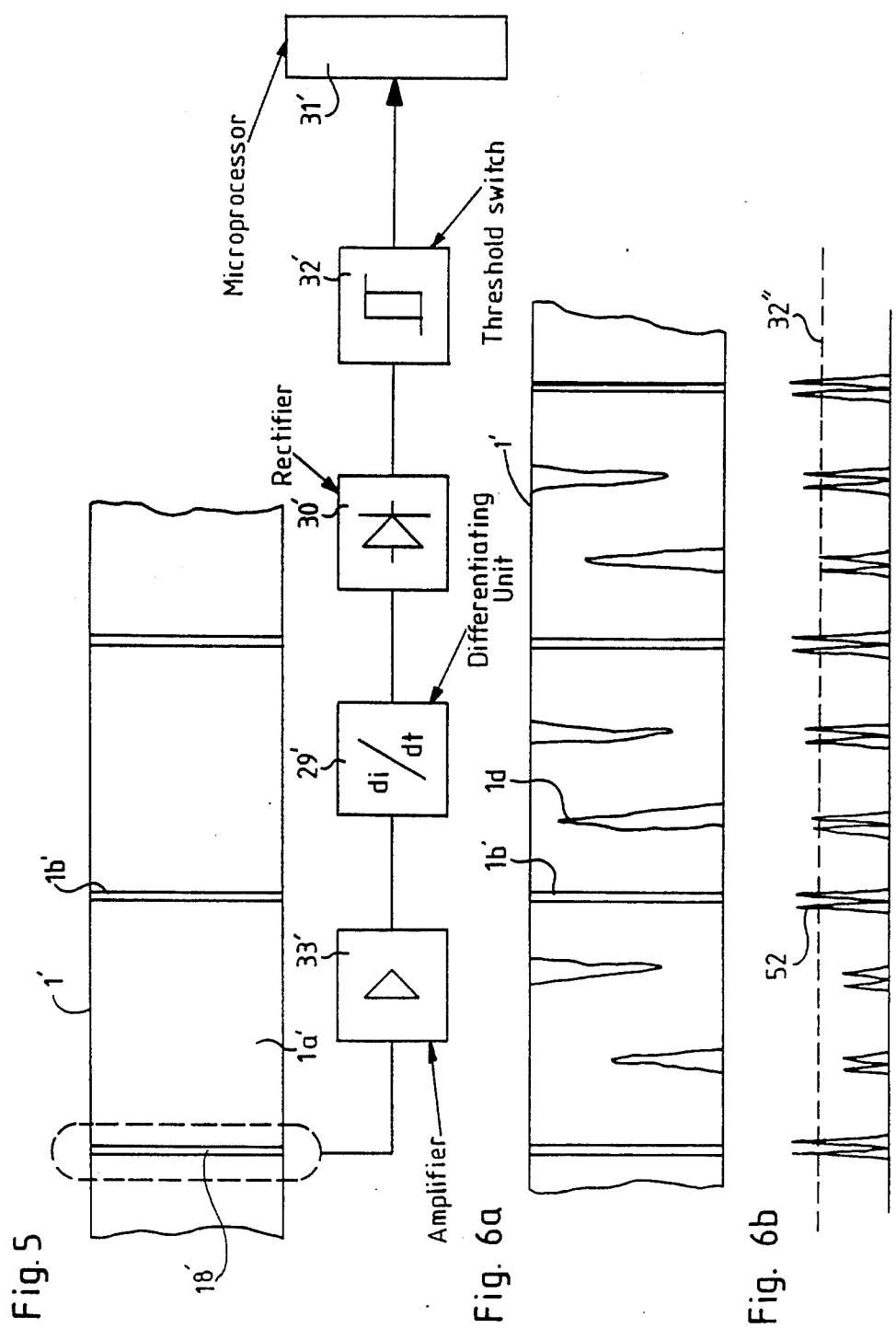

METHOD OF AND APPARATUS FOR POSITIONING PHOTOGRAPHIC ORIGINALS IN A COPYING STATION

BACKGROUND OF THE INVENTION

The invention relates generally to the copying of originals of photosensitive material, especially photographic originals.

More particularly, the invention relates to a method of positioning coherent originals of a strip of photosensitive material in a copy window of a copying apparatus having automatic conveying means for the photosensitive material. The conveying means is controlled by a photoelectric unit which detects the edges of the originals.

The invention also relates to a copying apparatus which allows coherent originals of a strip of photosensitive material to be properly positioned in a copy window of the apparatus. The apparatus includes the previously mentioned automatic conveying means and photoelectric unit, and the latter has a scanning slit which is in register with, and extends transverse to, the path defined by the conveying means. The apparatus further includes a memory which stores the signals from the photo-electric unit in correlation to the position coordinates of the respective regions of the photo-sensitive material responsible for the signals. A processing unit is provided to calculate position coordinates for the originals based upon the signals obtained from the scanning of a section of the photosensitive material containing several originals.

A method of and a device for automatically detecting the image areas of a filmstrip by photosensitive scanning is known from the West German Pat. No. 27 05 097, for example. Scanning is accomplished via an illuminated scanning slit which extends parallel to the separating bands between neighboring image areas and is moved relative to the film. Here, the distance between leading and trailing edges of the images is newly determined for each film, e.g., on the basis of the density values measured within the confines of the slit, and this distance used to find poorly defined image edges when the remaining image edges are readily detectable. In the apparatus described in the West German patent, a gap equivalent to the length of several negatives or originals lies between the scanning slit and the processing station where an edge notch is applied in correlation to a detected image. Within this gap, a pattern containing an integral multiple of the measured total length of an original plus separating band is placed over the scanned film in order that even less readily detectable image edges can be located.

A problem arises in precisely following a region of the film which becomes established as the location of an image edge on the basis of subsequent calculations during travel from the scanning station to the processing station. The distance measurement involved is normally carried out by means of friction rolls engaging the film and arranged so that the rotational movement thereof is converted into pulses or, when a stepping motor is employed for film transport, by counting the control pulses for the motor. The precision of this distance measurement depends upon the absence of slip between the film surface and the measuring or drive rolls, and upon the absence of wear which would change the diameter of the friction rolls. However, these two requirements are very difficult to satisfy simultaneously. As a rule, rolls having a high coefficient of friction are subject to wear and can deform elastically. On the other hand, wear-resistant rolls have a smooth surface so that slip occurs readily. The precision with which film transport is monitored is thus critical, especially when movement of the film is to be monitored over relatively large distances.

OBJECTS AND SUMMARY OF THE INVENTION

It is an object of the invention to reduce the effect of slip on the measurement of distance traveled by photosensitive material.

Another object of the invention is to reduce the effect of wear on the measurement of distance traveled by photosensitive material.

An additional object of the invention is to reduce the effects of slip and wear on the accuracy with which image areas of photosensitive material are positioned at a predetermined location, e.g., in a copy window, even when the photosensitive material must travel over a relatively large distance.

A further object of the invention is to provide a method which allows coherent originals of a strip of photosensitive material to be positioned at a predetermined location, such as a copy station, with an improved degree of precision.

It is also an object of the invention to provide an apparatus which enables coherent originals of a strip of photosensitive material to be positioned at a predetermined location, such as a copy station, with an improved degree of accuracy.

The preceding objects, as well as others which will become apparent as the description proceeds, are achieved by the invention.

One aspect of the invention resides in a method of positioning coherent originals of a strip of photosensitive material, e.g., a photographic filmstrip. In the method, the photosensitive material is conveyed between a first location and a second location of a predetermined path for a first time. The path has a portion in which the originals are to be temporarily positioned for an operation. By way of example, this portion of the path may be located in a copy station and the operation may involve making copies of the originals. A predetermined parameter of each of a plurality of segments of the photosensitive material is measured during the first passage between the first and second locations of the path to obtain predetermined values suitable for determining position coordinates of the originals. The measuring step, which is preferably performed photoelectrically, may include measurement of a density change in each of the segments. A first position coordinate is established for each of the segments and a second position coordinate is calculated for each of the originals using the predetermined values and first position coordinates of the segments The photosensitive material is conveyed between the first and second locations of the path for a second time and each of the originals is positioned in the previously mentioned portion of the path during the second passage between these locations. The positioning step is performed using the second position coordinates and includes compensating for differences in movement of the photosensitive material during the first and second passages between the first and second locations of the path.

The photosensitive material may be conveyed along the path lengthwise and the measuring step may then comprise scanning the photosensitive material widthwise. Each of the scanned segments preferably has a width, as considered lengthwise of the photosensitive material, which is small in relation to the length of the photosensitive material. The conveying steps will normally be performed automatically and the method may further comprise the step of regulating the second conveying step using the results of the measuring step.

The predetermined value or values obtained upon measurement of a segment may be stored in correlation to the first position coordinate of the segment prior to the calculating step. Similarly, the second position coordinates of the originals may be stored prior to the positioning step.

In the method according to the invention, the photosensitive material is completely scanned twice. The first complete scanning procedure makes it possible to ensure that all of the information in the photosensitive material for determining the coordinates, e.g., the longitudinal coordinates, of the image areas or originals can be optimally evaluated. The precision of the positioning is not affected by possible slip effects since the position coordinates are again determined during the second passage of the photosensitive material along its path and differences in the distance of transport during the first and second passages are compensated for. The longitudinal coordinates obtained for pronounced features of the photosensitive material during the first passage of the latter along its path are thus used as a check for measurements of the longitudinal coordinates made during the second passage.

The photosensitive material may be provided with apertures or holes having positions which are not correlated to those of the images and the longitudinal coordinates of such apertures may be determined and stored during the first passage of the photosensitive material between the first and second locations of its path. According to the invention, the stored longitudinal coordinates of the apertures may be used as a check for measurements of the longitudinal coordinates obtained during the second passage of the photosensitive material between the first and second locations of its path. Similarly, regions within the image areas exhibiting marked or abrupt density changes may be used for checking purposes. In this manner, errors due to slip may be prevented from adding up over the entire length of the image and, instead, can be corrected at each region along or within the image exhibiting a pronounced density difference.

Another aspect of the invention resides in an apparatus for operating with coherent originals of a strip of photosensitive material, particularly a photographic filmstrip. The apparatus includes means for conveying the photosensitive material between first and second locations of a predetermined path having a portion in which the originals are to be temporarily positioned for an operation. The apparatus may be a copying apparatus, for instance, and this portion of the path might then be located in a copy station constituting part of the apparatus. Means is provided for measuring a predetermined parameter of each of a plurality of segments of the photosensitive material between the first and second locations of the path to obtain predetermined values suitable for determining position coordinates of the originals. The measuring means, which is preferably photoelectric, may comprise a scanning slip which extends transversely of the path and may be designed to measure changes in density. The apparatus further includes means for establishing a position coordinate for each of the segments, and control means connected with the conveying means, the measuring means and the establishing means. The control means is arranged to receive a predetermined value of the predetermined parameter, as well as a first position coordinate, for each of the segments during a first passage of the photosensitive material between the first and second locations of the path. The control means is programmed to calculate a second position coordinate for each original using the predetermined values and the first position coordinates. Moreover, the control means is programmed to regulate the conveying means on the basis of the second position coordinates so as to position each of the originals in the previously mentioned portion of the path during a second passage of the photosensitive material between the first and second locations of the path. The control means is also programmed to compensate for differences in movement of the photosensitive material between the first and second locations of the path.

The control means may include memory means designed to store the predetermined value for each segment in correlation to the respective first position coordinate.

The apparatus in accordance with the invention is particularly well-suited for carrying out the method according to the invention.

The novel features which are considered as characteristic of the invention are set forth in the appended claims. The improved positioning method, as well as the construction and mode of operation of the apparatus designed to improve positioning, will, however, be best understood upon perusal of the following detailed description of certain specific embodiments when read in conjunction with the accompanying drawings.

BRIEF DESCRIPTION OF THE DRAWINGS

FIG. 5 diagrammatically illustrates a positioning device according to the invention for photosensitive material without transporting apertures;

FIG. 6a is a fragmentary view of a strip of photosensitive material containing regions which have a pronounced density variation and can be employed for positioning purposes when using the device of FIG. 5; and FIG. 6b is a diagram showing pulses which are generated in response to detection of the regions of pronounced density variation illustrated in FIG. 6a.

DESCRIPTION OF THE PREFERRED EMBODIMENTS

Figure 1:
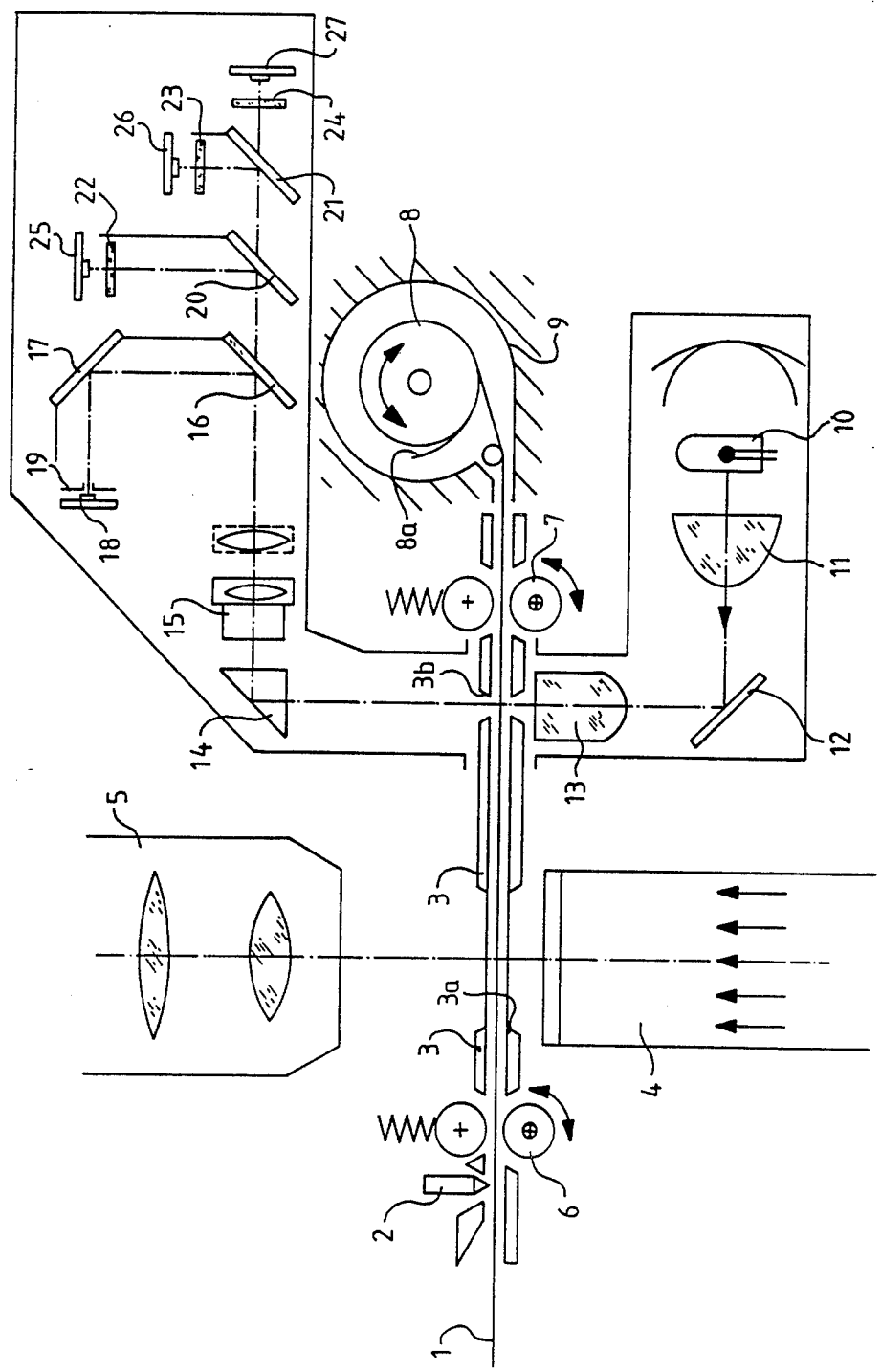
FIG. 1 is a schematic front view of a copying apparatus in accordance with the invention.
Figure 2:
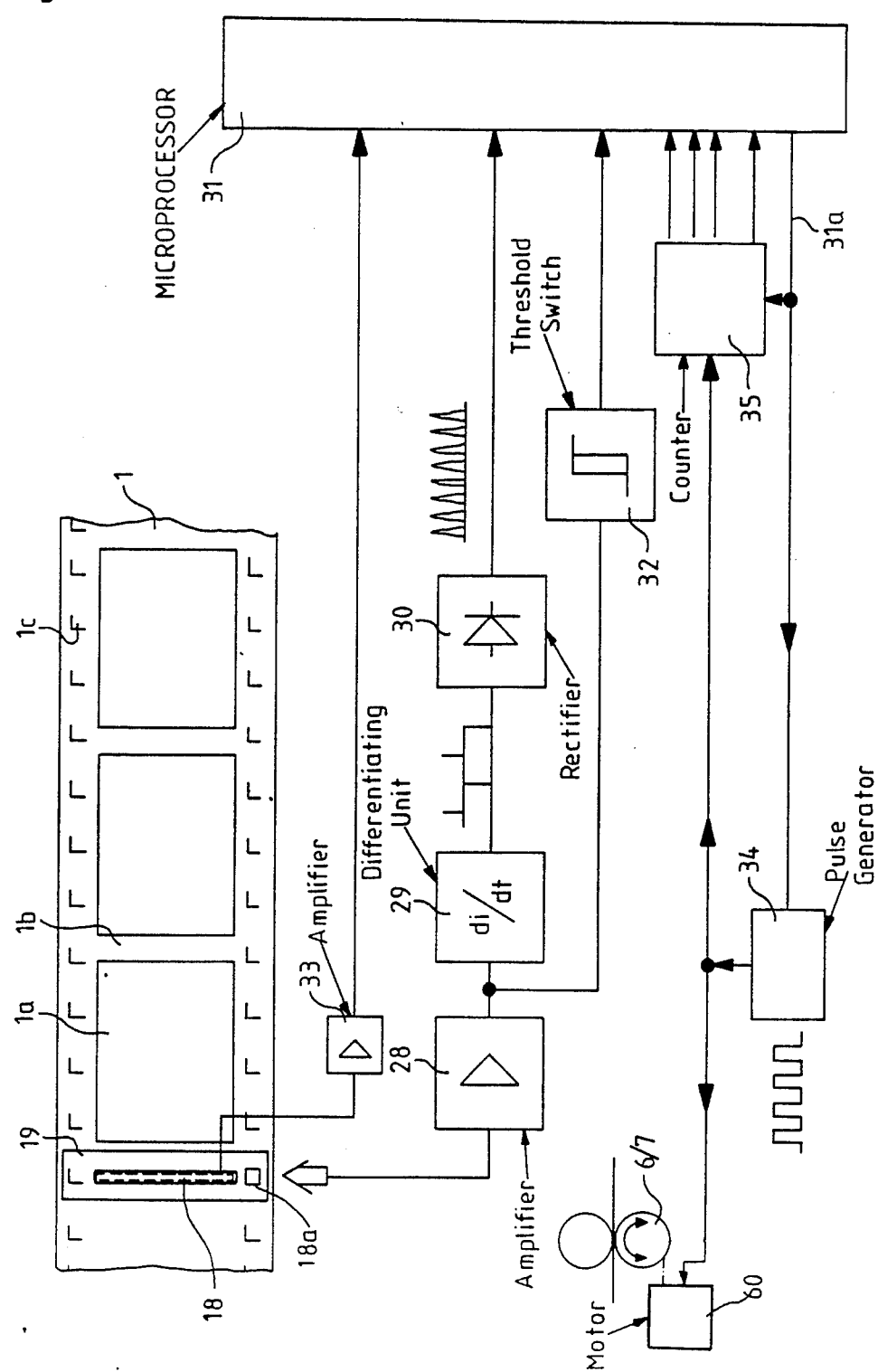
FIG. 2 diagrammatically illustrates a device for use in the apparatus of FIG. 1 to carry out a positioning procedure according to the invention.

FIGS. 1 and 2 show an apparatus in accordance with the invention for operating with coherent image areas or originals 1a such as negatives, constituting part of a strip of photosensitive material 1 which is here assumed to be a photographic filmstrip. The apparatus illustrated in FIGS. 1 and 2 is a copying apparatus or copier which is designed to make copies or reproductions of the originals 1a. The filmstrip 1 is to be processed in the apparatus as a unit.

As best seen in FIG. 2, the longitudinal marginal portions of the filmstrip 1 are provided with transporting apertures or holes 1c. The transporting apertures 1c at each marginal portion of the filmstrip 1 are arranged in a row extending lengthwise of the filmstrip 1. The apertures 1c are applied to the filmstrip 1 with a high degree of precision so that the distance between neighboring apertures 1c is uniform. However, the positions of the apertures 1c along the filmstrip 1 are not correlated to those of the originals 1a.

A separating or dividing band 1b running transversely of the filmstrip 1 is disposed between each pair of neighboring originals 1a. The densities of the separating bands 1b generally differ from those of the originals 1a.

Referring to FIG. 1, the filmstrip 1 is introduced into the apparatus by inserting the filmstrip 1 in a film guide 3. A film sensor 2, e.g., a conventional pronged or reflex light barrier, is located at the inlet of the film guide 3. The apparatus is further provided with a reflecting lamp housing 4 which is designed to illuminate the originals 1a and the film guide 3 has a copying window 3a in register with the housing 4. An object 5 is disposed above the copying window 3a and forms an image of an original 1a positioned in the copying window 3a on non-illustrated copy material.

The film guide 3 is provided with cutouts for two pairs of transporting or conveying rolls 6 and 7 which serve to convey the filmstrip 1 along a horizontal path as seen in FIG. 1. The transporting rolls 6 and 7 are driven by a reversible stepping motor 60 shown in FIG. 2. The pair of transporting rolls 6 is located upstream of the copying window 3a as considered in the direction of movement of the filmstrip 1 when the latter is introduced into the apparatus. A scanning slit 3b is formed in the film guide 3 downstream of the copying window 3a and the pair of transporting rolls 7 is disposed downstream of the scanning slit 3b. The rolls 7 constitute a main drive for the filmstrip 1 while the rolls 6 constitute an auxiliary drive.

The film guide 3 has an outlet end downstream of the rolls 7 and a coiling chamber 9 adjoins the outlet end of the film guide 3. The coiling chamber 9 accommodates a spool 8 onto which the filmstrip 1 may be wound and the spool 8 is provided with a holder 8a serving to grip the leading end of the filmstrip 1 as the latter enters the coiling chamber 9. The coiling chamber 9 may be considered to constitute a temporary storage area or space for the filmstrip 1.

The scanning slit 3b extends transversely of the path of the filmstrip 1 and allows successive strip-shaped segments of the filmstrip 1 to be scanned by a photoelectric unit as the filmstrip 1 travels along its path. The scanning slit 3b is narrow as considered longitudinally of the path of the filmstrip 1 and each of the segments of the filmstrip 1 scanned via the scanning slit 3b has a width, as considered longitudinally of the filmstrip 1, which is small in relation to the length of the filmstrip 1.

The scanning slit 3b is illuminated by a lamp 10 and light from the lamp 10 is directed to the scanning slit 3b by a reflector located behind the lamp 10. Light from this reflector travels through a condenser 11 to another reflector 12. The reflector 12 deflects the light to a cylindrical lens 13 serving to uniformly illuminate the scanning slit 3b with light rays which are at least closely parallel to one another. After crossing the path of the filmstrip 1, the light travels through a prism 14 to an objective 15. The objective 15 is interchangeable and is selected so that it corresponds or is matched to the width of the filmstrip 1. The light leaving the objective 15 travels to a beam splitter 16 which directs a portion of the light to a reflector 17. The reflector 17 deflects the arriving light towards a slotted stop 19 positioned in front of a sensor which includes a linear array, i.e., a row, of photoelectric measuring cells 18. The objective 15 forms an image of the scanning slit 3b, or of the segment of the filmstrip 1 in register with the slit 3b, on the row of measuring cells 18. As shown in FIG. 2, the row of measuring cells 18 is positioned to scan the originals 1a and the separating bands 1b, and the length of the row approximates the width of the originals 1a. The sensor including the measuring cells 18 further comprises an additional photoelectric measuring cell 18a which is arranged to scan the apertures 1c at one of the marginal portions of the filmstrip 1.

The portion of the light which passes through the beam splitter 16 arrives at a dichroic beam splitter 20, i.e., a beam splitter which is partially light-transmissive with respect to color. The beam splitter 20 directs a portion of the impinging light towards a color filter 22 positioned in front of a sensor 25 with a linear array or row of photo-electric measuring cells which are sensitized to light in a first one of the primary colors red, green and blue. The portion of the light which penetrates the beam splitter 20 travels to a second dichroic beam splitter 21 which reflects a portion of the arriving light to a color filter 23 disposed in front of a sensor 26. The sensor 26 contains a linear array or row of photoelectric measuring cells which are sensitized to light in a second one of the primary colors red, green and blue. Finally, the portion of the light which travels through the beam splitter 21 arrives at a color filter 24 located in front of a sensor 27 which again includes a linear array or row of photoelectric measuring cells. The measuring cells of the sensor 27 are sensitized to light in the third of the primary colors red, green and blue. The rows of measuring cells in the sensors 25,26,27 correspond to the row of measuring cells 18. Due to appropriate selection of distances, the objective 15 forms a sharp image of the segment of the filmstrip 1 in register with the scanning slit 3b on each row of measuring cells. The various measuring cells generate signals in response to impingement of light upon the same.

In accordance with FIG. 2, the signal from the measuring cell 18a arranged to scan the apertures 1c is sent to an amplifier 28 and then to a differentiating unit 29. The differentiating unit 29 emits a positive pulse for each transition from the filmstrip 1 to an aperture 1c and a negative pulse for each transition from an aperture 1c to the filmstrip 1. A rectifier 30 converts the negative pulses into positive pulses so that a rectified series of pulses indicates the beginning and end, respectively, of an aperture 1c. The signal emitted by the amplifier 28 and sent to the differentiating unit 29 is tapped upstream of the differentiating unit 29 and further sent to a threshold switch 32. The threshold switch 32 converts the tapped signal into a bright/dark signal which makes it possible to differentiate between the filmstrip 1 and an aperture 1c. The pulses issuing from the rectifier 30 and the signals generated by the threshold switch 32 are sent to a microprocessor or control unit 31 which may, for example, be constituted by a conventional 8-bit processor. The signals generated by the measuring cells 18 during scanning of the originals 1a, or an averaged signal for the portion of an original 1a in register with the scanning slit 3b, travel or travels to the microprocessor 31 via an amplifier 33. The microprocessor 31 examines these image area signals in a known manner to detect leading and trailing edges of the originals 1a, that is, the transitions between the originals 1a and the separating bands 1b. By way of example, the microprocessor 31 can evaluate such image area signals according to the teachings of the West German Pat. No. 27 05 097.

A counter 35 which can count forwards and backwards, is readable and can be cleared by external pulses is connected to the microprocessor 31. The microprocessor 31 has an output 31a which emits pulses denoting the manner of counting, namely, forwards or backwards, depending upon whether a pulse generator 34 for the reversible stepping motor 60 which drives the film transporting rolls 6,7 runs forwards or backwards. The counter 35 always operates in the same direction as the pulse generator 34.

The operation of the copying apparatus of FIGS. 1 and 2 is as follows:

The leading end of the filmstrip 1 is inserted in the film guide 3 by hand from the left as seen in FIG. 1. The film sensor 2 causes the auxiliary film transporting rolls 6 to begin operating and the transporting rolls 6 continuously advance the leading end of the filmstrip 1 past the copying window 3a and the scanning slit 3b to the main film transporting rolls 7. The main film transporting rolls 7 then take over transport of the filmstrip 1 while the auxiliary film transporting rolls 6 are made inoperative, e.g., by moving one or both of the rolls 6 away from the filmstrip 1. The transporting rolls 7 feed the leading end of the filmstrip 1 into the coiling chamber 9 where, due to the configuration of the coiling chamber 9, the leading end of the filmstrip 1 is guided to and gripped by the film holder 8a of the spool 8. The spool 8 has its own drive which, however, is so designed that distance of travel and transport speed are determined by the main transporting rolls 7.

When the leading end of the filmstrip 1 passes by the scanning slit 3b, the scanning operation begins. The portion of the light transmitted by the beam splitter 16 is used by the sensors 25,26,27 to measure a characteristic of the originals 1a in the three primary colors red, green and blue segment-by-segment. At least one hundred measurements or values per color are obtained for each original 1a and these values are processed, e.g., in accordance with the teachings of the West German Pat. No. 28 40 287, to determine the color composition of the copy light and the exposure time so as to obtain optimally filtered copies or reproductions.

The portion of the light reflected by the beam splitter 16 and coming from the originals 1a is continuously monitored via the measuring cells 18 to detect characteristic regions of the originals 1a. In the present description, this portion of the light is continuously monitored for marked or abrupt density changes, i.e., density increases or decreases, or characteristic density variations. The signals generated by the measuring cells 18 are sent to the microprocessor 31 after appropriate amplification in the amplifier 33 and, if necessary or desirable, suitable conversion by a pulse forming unit. Simultaneously, the portion of the light reflected by the beam splitter 16 and coming from the marginal portion of the filmstrip 1 corresponding to the measuring cell 18a is monitored to detect the apertures 1c. The signals generated by the measuring cell 18a upon detection of the leading and trailing edges of the apertures 1c are amplified by the amplifier 28 and thereafter converted into pulses of the same sign by the differentiating unit 29 and the rectifier 30. The rectified pulses issuing from the rectifier 30 are fed into the microprocessor 31 together with information from the threshold switch 32 as to whether the filmstrip 1 or an aperture 1c is currently aligned with the measuring cell 18a. In addition, the counter 35 introduces the longitudinal coordinate, i.e., the position along the filmstrip 1, of the region being scanned into the microprocessor 31 in correlation to the measurements derived from such region. The microprocessor 31 includes a register in which the information from the measuring cells 18,18a and the counter 35 is stored in a suitable manner. The entire filmstrip 1 is scanned in the above fashion by advancing the filmstrip in steps. With respect to density changes in the originals 1a, at least those density jumps having a certain minimum magnitude are registered.

Once the filmstrip 1, which is continuously scanned in the scanning slit 3b, has been coiled into the coiling chamber 9 to such an extent that the trailing end of the filmstrip 1 passes by the film sensor 2, transport of the filmstrip 1 is terminated after allowing the filmstrip 1 to travel an additional distance which suffices for the trailing end of the filmstrip 1 to move past the scanning slit 3b. Subsequently, the motor 60 and the counter 35 are reversed by means of a signal from the output 31a of the microprocessor 31.

Before or during exit of the filmstrip 1 from the coiling chamber 9, the precise positions of the originals 1a are calculated. The position of each original 1a is calculated in correlation to the longitudinal coordinates determined by the counter 35. Calculation of the positions of the originals 1a, that is, of longitudinal coordinates for the originals 1a, is performed using the measurements of density change derived from the measuring cells 18 and the longitudinal coordinates of those regions exhibiting characteristic density changes. The originals 1a are to be copied during unwinding of the filmstrip 1 from the spool 8 and the longitudinal coordinates of the originals 1a are to be used for properly positioning the originals 1a in the copying window 3a.

Figure 3:
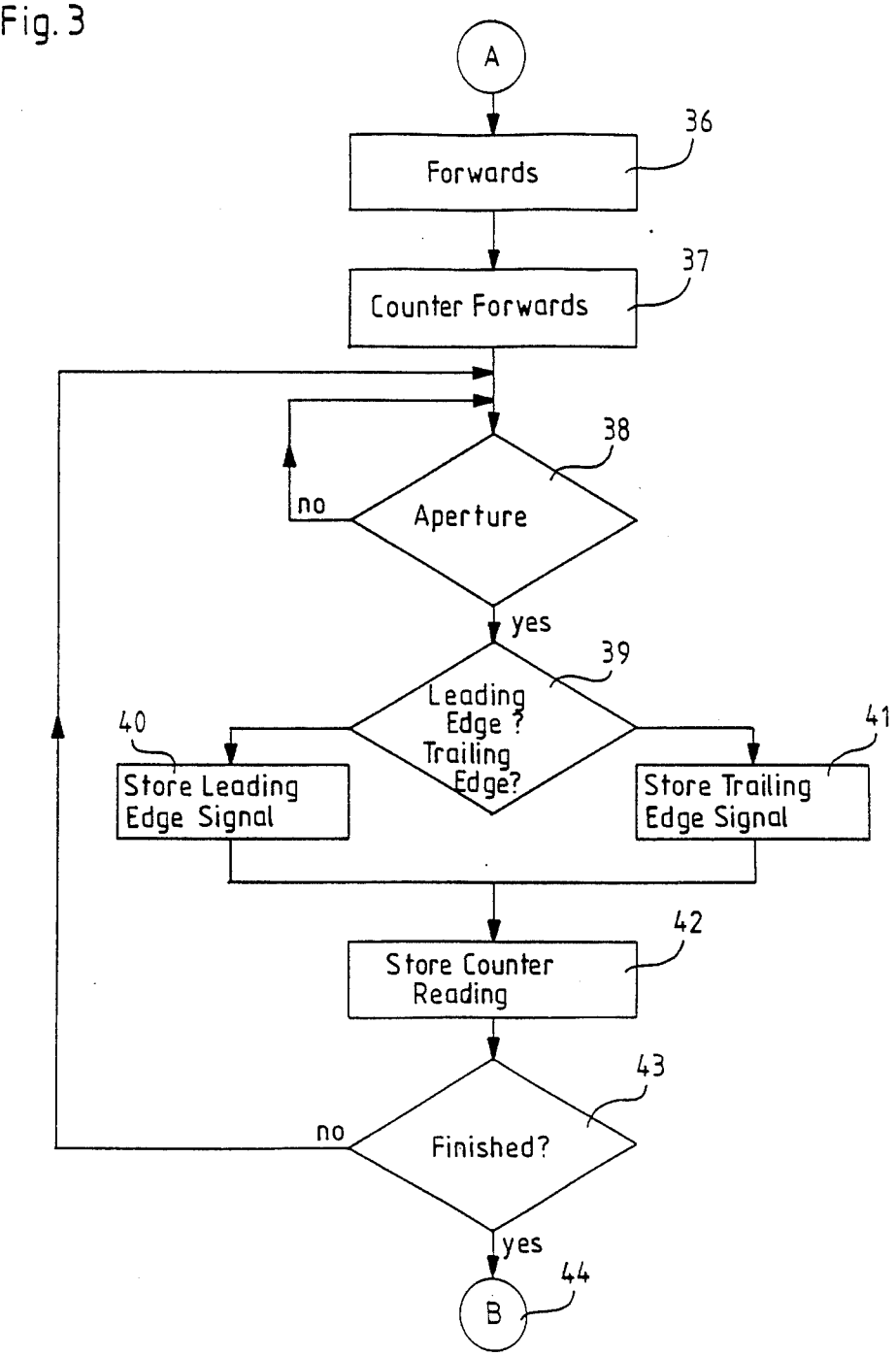
FIG. 3 is a flow diagram illustrating the initial part of a positioning procedure in accordance with the invention.
Figure 4:
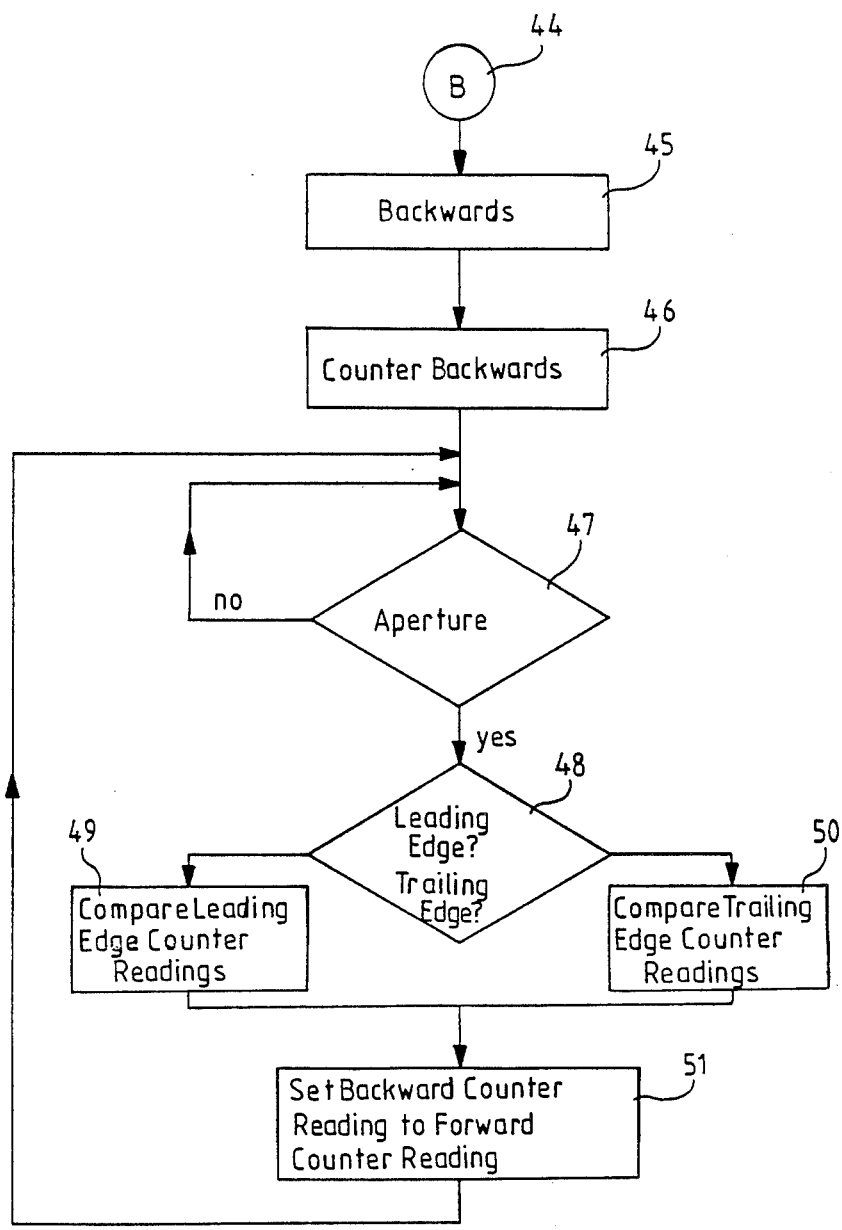
FIG. 4 is a flow diagram illustrating the terminal part of the positioning procedure of FIG. 3.

In order to prevent an apparent shifting of the positions of the originals 1a by slip effects which are cumulative over the length of the filmstrip 1, the positions of those regions of the filmstrip 1 exhibiting characteristic density changes are checked during unwinding of the filmstrip 1 from the spool 8 and, if necessary, apparent shifts in the positions of the originals 1a are compensated for. The procedure which is followed to properly position the originals 1a in the copying window 3a for reproduction is illustrated in the flow diagrams of FIGS. 3 and 4. In FIGS. 3 and 4, the term "forwards" as applied to the filmstrip 1 indicates movement of the filmstrip 1 towards the coiling chamber 9 while the term "backwards" refers to movement of the filmstrip 1 away from the coiling chamber 9.

As shown at 36 in FIG. 3, the filmstrip 1 is first moved forwards in steps so that it is wound onto the spool 8 of the coiling chamber 9. At the same time, the counter 35 counts forwards as indicated at 37. Per 38, the filmstrip 1 is checked upon taking each step to determine whether an aperture 1c is present in the scanning slit 3b and a corresponding INTERRUPT is required. If this is not the case, the routine of advancing the filmstrip 1 by a step and checking for the presence of an aperture 1c is repeated. On the other hand, when the stepwise advance of the filmstrip 1 causes an edge of an aperture 1c to move into the scanning slit 3b, a check is performed as at 39 to establish whether such edge is the leading edge or the trailing edge of the aperture 1c. Per 40 and 41, signals denoting the presence of a leading edge are stored in a first memory whereas signals denoting the presence of a trailing edge are stored in a second memory. The count of the counter 35 corresponding to each edge is stored in correlation to the signal for the respective edge as indicated at 42. In accordance with 43, a check is performed to determine whether the trailing end of the filmstrip 1 has arrived at the scanning slit 3b. If not, the routine described above is restarted between 37 and 38. If yes, the direction of movement of the filmstrip 1, as well as the direction of counting of the counter 35, are reversed. As indicated by 44, this leads to the flow diagram of FIG. 4.

Per 45, the filmstrip 1 now travels backwards in steps and is unwound from the spool 8 of the coiling chamber 9. As the filmstrip 1 moves backwards, the counter 35 counts backwards in accordance with 46. At 47, a check is carried out to establish whether an aperture 1c is present in the scanning slit 3b and a corresponding INTERRUPT is required. If this is not the case, the routine of moving the filmstrip 1 by a step and checking for the presence of an aperture 1c is begun once more between 46 and 47. If, however, an edge of an aperture 1c has moved into the scanning slit 3b, a check is performed at 48 to determine whether such an edge is the leading edge or the trailing edge of the aperture 1c. Should the edge be a leading edge, the current count of the counter 35 is compared with the stored count of the counter 35 for the same edge as indicated at 49. In the event that the current count and the stored count differ, the current count of the counter 35 is changed per 51 to be the same as the stored count. In other words, the counter 35 is set forwards or backwards as appropriate so that the count for the particular leading edge during backward movement of the filmstrip 1 is identical to that which existed during forward movement of the filmstrip 1. In a similar manner, the current count of the counter 35 is compared with the stored count for the same edge as at 50 when the edge in the scanning slit 3b is a trailing edge of the aperture 1c. If the current count and the stored count are different, the current count of the counter 35 is changed as before per 51 to correspond to the stored count.

After the count of the counter 35 has been corrected, the above routine is repeated beginning between 46 and 47. This procedure is continued until each original 1a has been stopped in the copying window 3a, copied and transported away from the copying window 3a. The operation ends when the last original 1a of the filmstrip 1, as considered in the direction of backward movement of the filmstrip 1, has been in the copying window 3a and the end of the filmstrip 1 is held between the transporting rolls 6 for removal by hand.

As will be explained with reference to FIGS. 5, 6a and 6b, correction or compensation for slip can also be performed for a filmstrip 1' which does not have transporting apertures 1c. The filmstrip 1' again includes a series of coherent originals 1a' which are separated from one another by separating or dividing bands 1b'. Depending upon the type of camera, the originals 1a' in this embodiment extend to the lateral edges of the filmstrip 1' or terminate somewhat short of the lateral edges so that a narrow marginal portion of the filmstrip 1' is free of images. Likewise, depending upon the quality of the camera and upon the light intensity at the edges of the originals 1a' during the taking of a picture, the separating bands 1b' between neighboring originals 1a' are more or less straight and parallel to one another.

The cells of the linear array or row of measuring cells 18' can be connected in parallel so that they produce a common signal representing the integral transparency in the scanning slit 3b. This signal is amplified in the amplifier 33', differentiated in the differentiating unit 29' and rectified in the rectifier 30' to generate a series of pulses as before. The pulses issuing from the rectifier 30' travel to the threshold switch 32' and are thereafter introduced into the microprocessor 31'.

In FIG. 6a, the reference numeral 1d identifies characteristic transparent regions in the originals 1a' of the filmstrip 1' which extend across only part of the width of the filmstrip 1'. FIG. 6b shows a series of pulses 52 which are generated in response to detection of the separating bands 1b' and the characteristic transparent regions 1d, and the reference numeral 32" in FIG. 6b denotes a pulse threshold level which must be exceeded in order to activate the threshold switch 32'.

In the example of FIGS. 6a and 6b, the transparent separating bands 1b' extend across the entire width of the filmstrip 1' and produce relatively large pulses 52, e.g., pulses resembling telegraph poles. The characteristic transparent regions 1d produce pulses smaller than those for the separating bands 1b' and the pulses due to several of the characteristic transparent regions 1d do not exceed the threshold level 32" and thus do not suffice to activate the threshold switch 32'. Pulses which exceed the threshold level 32" are stored in the microprocessor 31' as the filmstrip 1' travels forwards. Upon backward movement of the filmstrip 1', the stored pulses are used in the manner described with reference to FIGS. 3 and 4 to correct or compensate for possible slip by changing the counter 35. In this way, characteristic or pronounced light/dark edges which are located within the motif of an image and are generally parallel to the scanning slit 3b are employed as a check during monitoring of the filmstrip 1' as the latter travels backwards into copying position.

The disclosed method in which the filmstrip passes by the scanning location twice for optimal positioning in a copying window is not limited to the case where the filmstrip initially travels in a first direction while being scanned and then travels in a second direction counter to the first direction for positioning in the copying window. Thus, the data processing and control procedures described above can also be used when the filmstrip is not coiled but is instead placed in a ready position on the right side of the copying apparatus as seen in FIG. 1. The filmstrip is then removed after it has passed through the copying apparatus in its entirety and the original leading end of the filmstrip is thereupon once again inserted in the film guide from the left. Furthermore, it is within the scope of the invention to provide a stamp or die in the region of the copying window. Such a stamp or die may be used in conjunction with the positioning of the originals in the copying window to provide the filmstrip with positioning notches which have positions related to those of the originals and can be used to control subsequent operations on the filmstrip, e.g., cutting of the filmstrip into sections with four or five originals each.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the instant contribution to the art and, therefore, such adaptations should and are intended to be comprehended within the meaning and range of equivalence of the appended claims.

What is claimed is:

1. A method of positioning coherent originals of a strip of photosensitive material, comprising the steps of conveying said photosensitive material between a first location and a second location of a predetermined path for a first time, said path having a portion in which said originals are to be temporarily positioned for an operation; measuring a predetermined parameter of each of a plurality of segments of said photosensitive material during the first passage between said locations to obtain predetermined values suitable for determining position coordinates of said originals; establishing a first position coordinate for each of said segments; calculating a second position coordinate for each of said originals using said predetermined values and said first position coordinates; conveying said photosensitive material between said locations for a second time; and positioning each of said originals in said portion of said path during the second passage between said locations, the positioning step being performed using said second position coordinates, and the positioning step including compensating for differences in movement of the photosensitive material during the first and second passages between said locations.

2. The method of claim 1, wherein the measuring step is performed photoelectrically.

3. The method of claim 1, wherein the measuring step comprises measuring a density change in each of said segments.

4. The method of claim 1, wherein the conveying steps comprise conveying said photosensitive material lengthwise and the measuring step comprises scanning said photosensitive material widthwise, each of said segments having a width, as considered lengthwise of said photosensitive material, which is small in relation to the length of said photosensitive material.

5. The method of claim 1, further comprising the step of storing the first position coordinate and a predetermined value of each segment in correlation to one another prior to the calculating step.

6. The method of claim 1, further comprising the step of storing said second position coordinates prior to the positioning step.

7. The method of claim 1, wherein said photosensitive material comprises a photographic filmstrip.

8. The method of claim 1, wherein the conveying steps are performed automatically; and further comprising the step of regulating the second conveying step using the results of the measuring step.

9. The method of claim 1, wherein said photosensitive material is provided with a plurality of apertures; and further comprising the steps of determining a first aperture position coordinate for each of said apertures during the first passage between said locations, storing said first aperture position coordinates, determining a second aperture position coordinate for each of said apertures during the second passage between said locations, and comparing each of said first aperture position coordinates with the respective second aperture position coordinate, said compensating including correcting a second aperture position coordinate upon deviation of the same from the respective first aperture position coordinate.

10. The method of claim 9, wherein the positions of said apertures and the positions of said originals are essentially uncorrelated.

11. The method of claim 1, wherein the measuring step comprises detecting a characteristic region in each of at least some of said segments; and further comprising the steps of determining an additional position coordinate for each of said regions during the second passage between said locations, and comparing each of said first position coordinates with the respective additional position coordinate, said compensating including correcting an additional position coordinate upon deviation of the same from the respective first position coordinate.

12. The method of claim 11, wherein each of said regions contains an abrupt change in density.

13. The method of claim 12, wherein each of said regions constitutes part of one of said originals.

14. The method of claim 1, wherein said photosensitive material is conveyed in a first direction during the first passage between said locations and in a second direction counter to said first direction during the second passage between said locations.

15. The method of claim 14, wherein the first conveying step comprises admitting said photosensitive material into a storage space and the second conveying step comprises withdrawing said photosensitive material from said storage space.

16. An apparatus for operating with coherent originals of a strip of photosensitive material, particularly a photographic filmstrip, comprising means for conveying the photosensitive material between first and second locations of a predetermined path having a portion in which the originals are to be temporarily positioned for an operation; means for measuring a predetermined parameter of each of a plurality of segments of the photosensitive material between said locations to obtain predetermined values suitable for determining position coordinates of the originals; means for establishing a position coordinate for each of the segments; and control means connected with said conveying means, said measuring means and said establishing means, said control means being arranged to receive a predetermined value of said predetermined parameter, and a first position coordinate, for each of the segments during a first passage of the photosensitive material between said locations, and said control means being programmed to calculate a second position coordinate for each original using said predetermined values and said first position coordinates, said control means further being programmed to regulate said conveying means on the basis of said second position coordinates so as to position each of the originals in said portion of said path during a second passage of the photosensitive material between said locations and to compensate for differences in movement of the photosensitive material during the first and second passages between said locations.

17. The apparatus of claim 16, wherein said measuring means is designed to measure changes in density.

18. The apparatus of claim 16, comprising means defining a scanning slit extending transversely of said path in alignment with said measuring means.

19. The apparatus of claim 16, wherein said measuring means is photoelectric.

20. The apparatus of claim 16, wherein said control means comprises memory means designed to store the predetermined value for each of the segments in correlation to the respective first position coordinate.

21. The apparatus of claim 16 for photo-sensitive material provided with apertures having positions which are essentially uncorrelated to the positions of the originals, wherein said measuring means comprises a sensor arranged to detect the apertures, said establishing means being arranged to establish aperture position coordinates for the apertures, and said control means being designed to receive and store a first aperture position coordinate for each of the apertures during the first passage of the photosensitive material between said locations and to receive a second aperture position coordinate for each of the apertures during the second passage of the photosensitive material between said locations, said control means being programmed to compare each of the first aperture position coordinates with the respective second aperture position coordinate and, upon deviation of the second aperture position coordinate from the respective first aperture position coordinate, to change said establishing means.

22. The apparatus of claim 21, wherein said control means is designed to change said establishing means from a second aperture position coordinate to the respective first aperture position coordinate upon deviation of the second aperture position coordinate from the first aperture position coordinate.

23. The apparatus of claim 21, further comprising pulse forming means between said sensor and said control means.

24. The apparatus of claim 23, wherein said control means comprises a microprocessor.

25. The apparatus of claim 16, wherein said measuring means is designed to detect characteristic regions in the segments, said establishing means being arranged to establish position coordinates for the characteristic regions, and said control means being designed to receive an additional position coordinate for each of the characteristic regions during the second passage of the photosensitive material between said locations, said control means being programmed to compare each of the additional position coordinates with the respective first position coordinate and, upon deviation of the additional position coordinate from the respective first position coordinate, to change said establishing means.

26. The apparatus of claim 25, wherein said control means is programmed to change said establishing means from an additional position coordinate to the respective first position coordinate upon deviation of the additional position coordinate from the first position coordinate.

27. The apparatus of claim 25, wherein said measuring means is designed to detect abrupt changes in density.

28. The apparatus of claim 25, wherein said conveying means is designed to advance the photosensitive material in steps and said establishing means comprises a counter arranged to count the steps.

29. The apparatus of claim 16, wherein said conveying means comprises a reversible stepping motor for advancing the photosensitive material in a first direction during the first passage between said locations and in a second direction counter to said first direction during the second passage between said locations, said establishing means including a reversible counter arranged to count the steps undergone by the photosensitive material, and said control means being designed to receive a first predetermined count from said counter upon arrival of a predetermined region of the photosensitive material at a predetermined location of said path during the first passage of the photosensitive material between said first and second locations and to receive a second predetermined count upon arrival of the predetermined region at said predetermined location during the second passage between said first and second locations, said control means being programmed to change said counter from said second predetermined count to said first predetermined count when said first and second predetermined counts are different.

30. The apparatus of claim 16, comprising a source of illumination, a stop in the path of the illumination from said source and having a slit-like opening in register with a section, and extending transversely, of said predetermined path, and means for focusing the section of said predetermined path in register with said slit-like opening on said measuring means, said focusing means including an objective matched to the width of the photosensitive material.

31. The apparatus of claim 30 for use with illumination having red, blue and green light components, wherein said focusing means additionally includes a first beam splitter; and further comprising a photoelectric exposure control unit having three sensors which are respectively sensitized to red, blue and green light, and additional beam splitters between said first beam splitter and said sensors for directing the red, blue and green light components of the illumination from said source to the respective sensors.

32. The apparatus of claim 30 for use with photosensitive material provided with apertures and having separating bands between neighboring originals, wherein said measuring means includes a first sensor positioned to detect the separating bands and a second sensor positioned to detect the apertures.

* * * * *